(12) United States Patent
Dally

(10) Patent No.: US 11,646,694 B2
(45) Date of Patent: May 9, 2023

(54) WINCH-PULLEY DRIVE SYSTEM FOR SOLAR TRACKER

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

( * ) Notice: Subject to any disclaimer, the term of this patent is extended or adjusted under 35 U.S.C. 154(b) by 0 days.

(21) Appl. No.: 17/515,195

(22) Filed: Oct. 29, 2021

(65) Prior Publication Data

US 2022/0140774 A1 May 5, 2022

Related U.S. Application Data

(60) Provisional application No. 63/108,069, filed on Oct. 30, 2020.

(51) Int. Cl.
 *H02S 20/32* (2014.01)
 *F16H 19/06* (2006.01)
 *F16M 11/20* (2006.01)

(52) U.S. Cl.
 CPC ......... *H02S 20/32* (2014.12); *F16H 19/0645* (2013.01); *F16M 11/2021* (2013.01); *F16H 2019/0686* (2013.01)

(58) Field of Classification Search
 CPC ....... H01L 31/00–078; Y02E 10/50–60; H02S 10/00–40; H02S 20/00–32; H02S 30/00–20; F16H 19/0645; F16H 2019/0686; F16M 11/2021
 USPC .................................................. 136/243–265
 See application file for complete search history.

(56) References Cited

U.S. PATENT DOCUMENTS

2019/0052224 A1* 2/2019 Schatz ................... F24S 25/12

FOREIGN PATENT DOCUMENTS

| CN | 209710009 | * 11/2019 |
| IN | WO2019043612 | * 7/2019 |
| KR | 10-20100061271 A | 6/2010 |
| KR | 10-20130023420 A | 3/2013 |
| KR | 10-1547827 B1 | 8/2015 |
| KR | 10-20160017239 A | 2/2016 |
| WO | 2012-066201 A1 | 5/2012 |
| WO | 2022094328 A1 | 5/2022 |

OTHER PUBLICATIONS

International Search Report & Written Opinion dated Feb. 23, 2022 for International Application PCT/US2021/057431 from Korean Intellectual Property Office, pp. 1-10, Republic of Korea.

* cited by examiner

*Primary Examiner* — Bach T Dinh

(74) *Attorney, Agent, or Firm* — Sherman IP LLP; Kenneth L. Sherman; Steven Laut

(57) ABSTRACT

One embodiment provides a drive system that includes a drive device with at least one drum for spooling at least one wire rope. A mounting device is connected to the drive device and a single-axis tracker. At least one partial pulley is connected to a torque tube. The at least one partial pulley is configured to accept the at least one wire rope and to transfer leveraged drive forces to the torque tube.

20 Claims, 17 Drawing Sheets

WINCH-PULLEY DRIVE SYSTEM FOR SOLAR TRACKER

CROSS-REFERENCE TO RELATED APPLICATIONS

This application claims the priority benefit of U.S. Provisional Patent Application Ser. No. 63/108,069, filed Oct. 30, 2020, which is incorporated herein by reference in its entirety.

BACKGROUND

One or more embodiments are directed to a drive system of pulleys and wire rope for rotating a torque tube of a single-axis solar tracker with solar modules attached.

Single-axis trackers are mounting structures used for the controlled movement of photovoltaic solar panels from east to west to track the sun daily.

All single-axis trackers place the solar collectors on top of the moving mechanical structure such that the moving mechanical structure will not shade the photovoltaic (PV) solar modules. Single-axis trackers that utilize a center torque tube as an axle require a drive system to turn the torque tube. Generally, the PV solar modules are moved from a 45° tilt eastward to a 45° tilt westward. Slightly higher tilts (e.g., 50°, 55°, 60° maximum) are achievable but with diminishing returns in gain for increase in cost, height, and vulnerability to the wind.

SUMMARY

Some embodiments relate to a drive system of pulleys and wire rope (s) or cable(s) for rotating a torque tube of a single-axis solar tracker with solar panels or modules (including multiple solar cells) attached. One embodiment provides a drive system that includes a drive device with at least one drum for spooling at least one wire rope. A mounting device is connected to the drive device and a single-axis tracker. At least one partial pulley is connected to a torque tube. The at least one partial pulley is configured to accept the at least one wire rope and to transfer leveraged drive forces to the torque tube.

Another embodiment provides a drive system that includes a drive device with a first drum and a second drum for spooling one or more cables. A mounting device is connected to the drive device and a single-axis tracker. A first partial pulley and a second partial pulley are each connected to a torque tube. The first and the second partial pulleys are each configured to accept the one or more cables and to transfer leveraged drive forces to the torque tube.

Still another embodiment provides a drive system that includes a drive device with a first drum and a second drum for spooling one or more cables. A mounting device is connected to the drive device and a single-axis tracker. A first partial pulley and a second partial pulley are each connected to a torque tube. The first and the second partial pulleys are each configured to accept the at least one cable and to transfer leveraged drive forces to the torque tube. A first solar component and a second solar component are each connected with the torque tube.

These and other features, aspects, and advantages of the embodiments will become understood with reference to the following description, appended claims, and accompanying figures.

DETAILED DESCRIPTION

Figure 1:
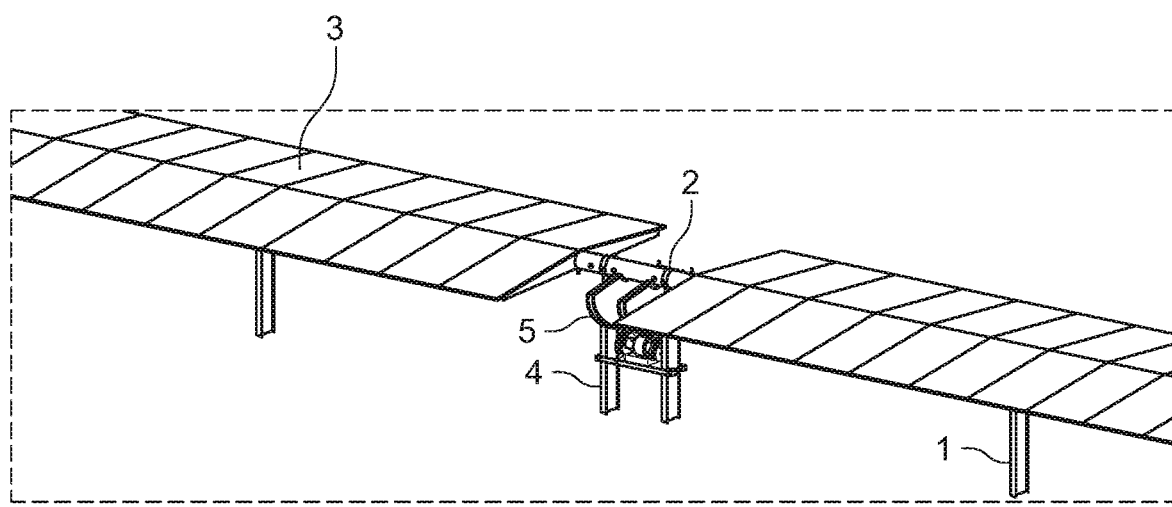
FIG. 1 shows a single-axis solar tracker mounted on posts on which a torque tube turns a contingent of solar modules, according to one or more embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some embodiments relate to a drive system of pulleys and one or more wire ropes or cables for rotating a torque tube of a single-axis solar tracker with one or more solar panels or solar modules (including multiple solar cells) attached. One embodiment provides a drive system that includes a drive device with at least one drum for spooling at least one wire rope. A mounting device is connected to the drive device and a single-axis tracker. At least one partial pulley is connected to a torque tube. The at least one partial pulley is configured to accept the one or more wire ropes and to transfer leveraged drive forces to the torque tube.

There are several innovations for one or more embodiments, which include at least: a half-pulley that attaches to the torque tube; a half-pulley that attaches at a slight angle relative to the normal of the torque tube; a half-pulley that moves cable (or wire rope) spooling and unspooling location as the torque tube rotates the solar modules or panels between an east tilt and a west tilt; a half-pulley that yields leverage to a slew drive; and a winch-pulley that attaches to two posts and is easily adjustable up and down (Z-axis) and left and right (X-axis). A slew drive is a type of gearbox designed to handle high radial, axial and moment loads, and to hold loads while also providing high rotational output torque. Typical slew drives include a worm gear mechanism, metal ball bearing component, rubber seals, and a sturdy housing to prevent environmental factors such as dirt, water and dust from compromising the working components. slew drives are powered by electricity, but may be powered hydraulically or magnetically as well.

The first basic concept of a central drive system for a large single-axis tracker row is to maintain engagement between the drive motor and the torque tube. A gear system must maintain strict alignment, otherwise disengagement between the drive gear and the larger torque tube gear can occur. A cable drive system can accept misalignments to a higher degree. Excessive misalignment can cause the wire rope to jump out of the partial pulley landing, over the landing area's retaining walls that effectively make the single groove.

One significant advantage of one or more embodiments is that the leveraged cable drive system increases the reliability by allowing a high tolerance in misalignment. Another advantage of the one or more embodiments is that they allow misalignment of the cable (or wire rope) with the half-pulley. Yet another advantage of one or more embodiments is use of a partial pulley. When the partial pulley is attached to the torque tube at a very slight angle (on the order of 0.5 degrees in the Z-axis), the system automatically maintains alignment with the spooling and unspooling of the cable (or wire rope) to and from the winch-pulley drum. Still another significant advantage of one or more embodiments for the cable drive system is that the slew drive may be loosened from its attachment to the drive posts and hang by the cables, self-aligning the slew drive with the half-pulleys on the torque tube and establishing the tautness of the wire ropes. Other advantages for one or more embodiments may include that the system leverages the small slew drive (e.g., ratios of 6:1 or 8:1), and the system reduces material and cost to make the half-pulley wider.

In one or more embodiments, a device comprises a grooved or non-grooved drum for spooling and unspooling wire rope (also referred to as cable) via a power source for mechanically turning a drive, such as a slew drive, using a half-pulley (also referred to as a partial pulley) attached to a torque tube for guiding and containing the wire rope in a single groove for a standard circular arc of the partial pulley. The device further includes a wire rope or a set or wire ropes that simultaneously spool and unspool from a smaller winch pulley (e.g., a machine including a drum(s) on an axle(s), with or without gearing, to give increased mechanical advantage) to the larger radius half-pulley mounted to the torque tube. One or two round drums are attached to a slew drive to perform as a winch with a smaller radius than that of the larger partial pulley or two partial pulleys attached to the torque tube, therefore achieving leverage from a relatively small slew drive. A relatively small diameter drum on the slew drive, typically about ten inches in diameter, with a drum surface that can be either smooth or grooved, turns more times than the larger half-pulley connected to the torque tube. Thus, the wire rope travels left and right as it feeds out on one side (i.e., unwraps from the spool drum) and simultaneously feeds in on the other side (i.e., wraps onto the spool), either riding a groove in the drum, left and right, or by rubbing against the existing wrap of wire rope on a smooth spool (non-grooved). The movement of the wire rope, left or right, for every full turn of the power drum (i.e., spool on the slew drive) is about the diameter of one wire rope. This requires that the half-pulley have a groove, or captured landing surface, wider than the diameter of the wire rope. The landing surface must have walls on either side to maintain the wire rope on the landing surface, and to guide the wire rope onto the landing surface of the partial pulley as the drum of the winch-pulley spools in and out the wire rope. This requires extra material to have a wide half-pulley.

In one or more embodiments, to maintain alignment without having to use a wide half-pulley, but instead to use a half-pulley with a single groove as wide as the wire rope, is to attach the half-pulley at a very slight angle in a vertical axis (Y), while remaining perpendicular to the torque tube in the horizontal axes (X and Z), so that the location of the half-pulley groove that is closest to the winch drum will drift as needed left and right along the X-axis (direction of the torque tube) to maintain alignment of the wire rope spooling, onto and off of, both the winch-pulley drum and the partial pulley on the torque tube. For example, in a leveraged ratio of 8:1, a typical winch-pulley drum of 10 inches diameter, or a 5 inch radius, turning a partial pulley with a 40 inch radius requires that the winch-pulley drum complete one full turn in each direction (i.e., ±360°) to turn the torque tube, and hence the solar panels ±45°. That means that the wire rope will travel left and right in the X-axis approximately ±one diameter (width) of the wire rope. In one embodiment, the wire rope is on the order of 0.5 inch diameter.

Some embodiments provide multiple functional advantages, such as yielding: enhanced leverage for a relatively small slew drive; enhanced forgiveness to misalignments; quick alignment and tautness of the wire ropes; and enhanced reliability with redundancy of two pulley systems on one slew drive.

Some embodiments provide a cable drive system by which a relatively small radius (or small diameter) round spool or drum, attached to a drive such as a slew drive, performs as a winch to pull a larger radius round partial pulley to yield leverage to the slew drive equal to the ratio of the radii of the partial pulley on the torque tube to that of the drive spool on the slew drive. The wire rope wraps only once on the larger radius torque tube partial pulleys, but can wrap and unwrap multiple times on the smaller diameter drive spool, which means that the wire rope will travel left and right relative to the position of a perfectly aligned half-pulley that is perfectly normal to the axis of the torque tube. The half-pulley landing for the wire rope should be wide enough to accept the relative movement of the spooling and unspooling of the wire rope from the smaller diameter drum.

In one or more embodiments, the half-pulley can remain narrow, just wide enough for the single spooling of the wire rope, that moves the position of its single narrow groove that is closest to the winch drum, left and right, as the large half-pulley turns approximately ±45°. In one embodiment, attaching the half-pulley at a slight angle onto the torque tube. The angle is small, on the order of ±0.5 degree, so as to not be at risk of buckling, but large enough to move the groove ±1 wire rope width left and right as the winch drum turns approximately ±360°.

In one or more embodiments, instead of a slew drive in line with the torque tube placed on top of the posts of a single-axis tracker, and therefore subject to the full torque of the wind and the critical field alignment of the slew drive and torque tube, the slew drive is fitted with one or two spool drums for wire ropes to pull on larger radius partial pulleys attached to the torque tube of the single-axis tracker. Therefore, the one or more embodiments obtain leverage, forgiveness in misalignments, and ease of adjustability.

FIG. 1 shows a single-axis solar tracker mounted on posts 1 on which a torque tube 2 turns a contingent of solar modules 3, according to one or more embodiments. The torque tubes 2 are turned by a drive system 4 that includes a drive motor powered to drive the torque tube half-pulley 5 and torque tubes 2. In one or more embodiments, in system 4 a grooved or non-grooved drum for spooling and unspooling wire rope (also referred to as cable) via a power source mechanically turns a drive, such as a slew drive or a winch, using a torque tube half-pulley 5 (also referred to as a partial pulley) that is attached to the torque tube 2 for guiding and containing the wire rope in a single groove for a standard circular arc of the torque tube half-pulley 5. The wire rope or a set or wire ropes simultaneously spool and unspool from a smaller winch pulley (e.g., a machine including a drum(s) on an axle(s), with or without gearing, to give increased mechanical advantage) to the larger radius torque tube half-pulley 5 mounted to the torque tube 2. One or two round drums are attached to a slew drive performs as a winch with a smaller radius than that of the larger torque tube half-pulleys 5 attached to the torque tube 2, therefore achieving leverage from a relatively small slew drive. A relatively small diameter drum on the slew drive, typically about ten inches in diameter, with a drum surface that can be either smooth or grooved, turns more times than the larger the torque tube half-pulley 5 connected to the torque tube 2. Thus, the wire rope travels left and right as it feeds out on one side (i.e., unwraps from the spool drum) and simultaneously feeds in on the other side (i.e., wraps onto the spool), either riding a groove in the drum, left and right, or by rubbing against the existing wrap of wire rope on a smooth spool (non-grooved). The movement of the wire rope, left or right, for every full turn of the power drum (i.e., spool on the slew drive) is about the diameter of one wire rope. This requires that the torque tube half-pulley 5 has a groove, or captured landing surface, wider than the diameter of the wire rope. The landing surface must have walls on either side to maintain the wire rope on the landing surface, and to guide the wire rope onto the landing surface of the torque tube half-pulley 5 as the drum of the winch-pulley spools in and out the wire rope.

To maintain alignment without having to use a wide groove torque tube half-pulley (but instead to use a torque tube half-pulley 5 with a single groove as wide as the wire rope), some embodiments have an attached torque tube half-pulley 5 at a very slight angle in a vertical axis (Y), while remaining perpendicular to the torque tube 2 in the horizontal axes (X and Z), such that the location of the torque tube half-pulley 5 groove that is closest to the winch drum drifts as needed left and right along the X-axis (direction of the torque tube) to maintain alignment of the wire rope spooling, onto and off of, both the winch-pulley drum and the torque tube half-pulley 5 on the torque tube 2. For example, in a leveraged ratio of 8:1, a typical winch-pulley drum of 10 inches diameter, or a 5 inch radius, turning a partial torque tube pulley with a 40 inch radius requires that the winch-pulley drum complete one full turn in each direction (i.e., ±360°) to turn the torque tube 2, and hence the solar panels 3 ±45°. That means that the wire rope will travel left and right in the X-axis approximately ±one diameter (width) of the wire rope. In one embodiment, the wire rope is on the order of 0.5 inch diameter.

Figure 2:
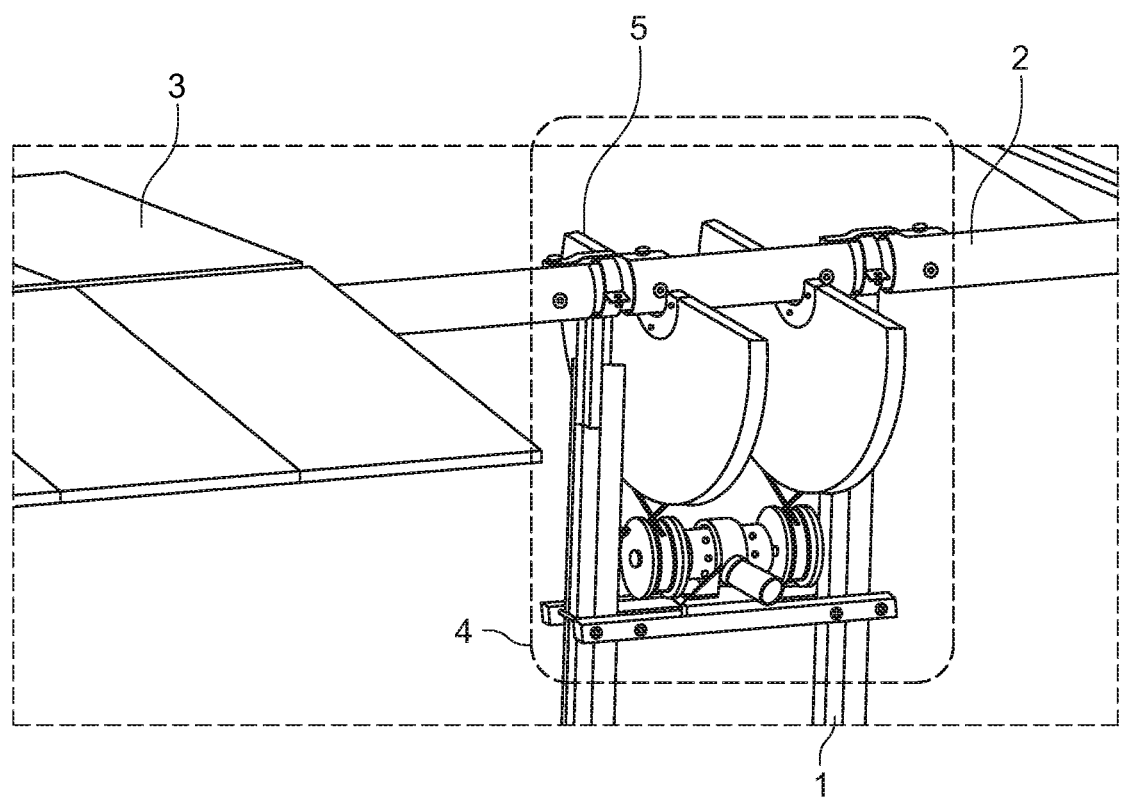
FIG. 2 shows a close-up view of a drive system of the single-axis solar tracker of FIG. 1, according to one or more embodiments.

FIG. 2 shows a close-up view of a drive system 4 of the single-axis solar tracker of FIG. 1, according to one or more embodiments. In one or more embodiments, the drive system 4 includes a pair of torque tube half-pulleys 5 and a pair of spool drums for the wire ropes.

Figure 3:
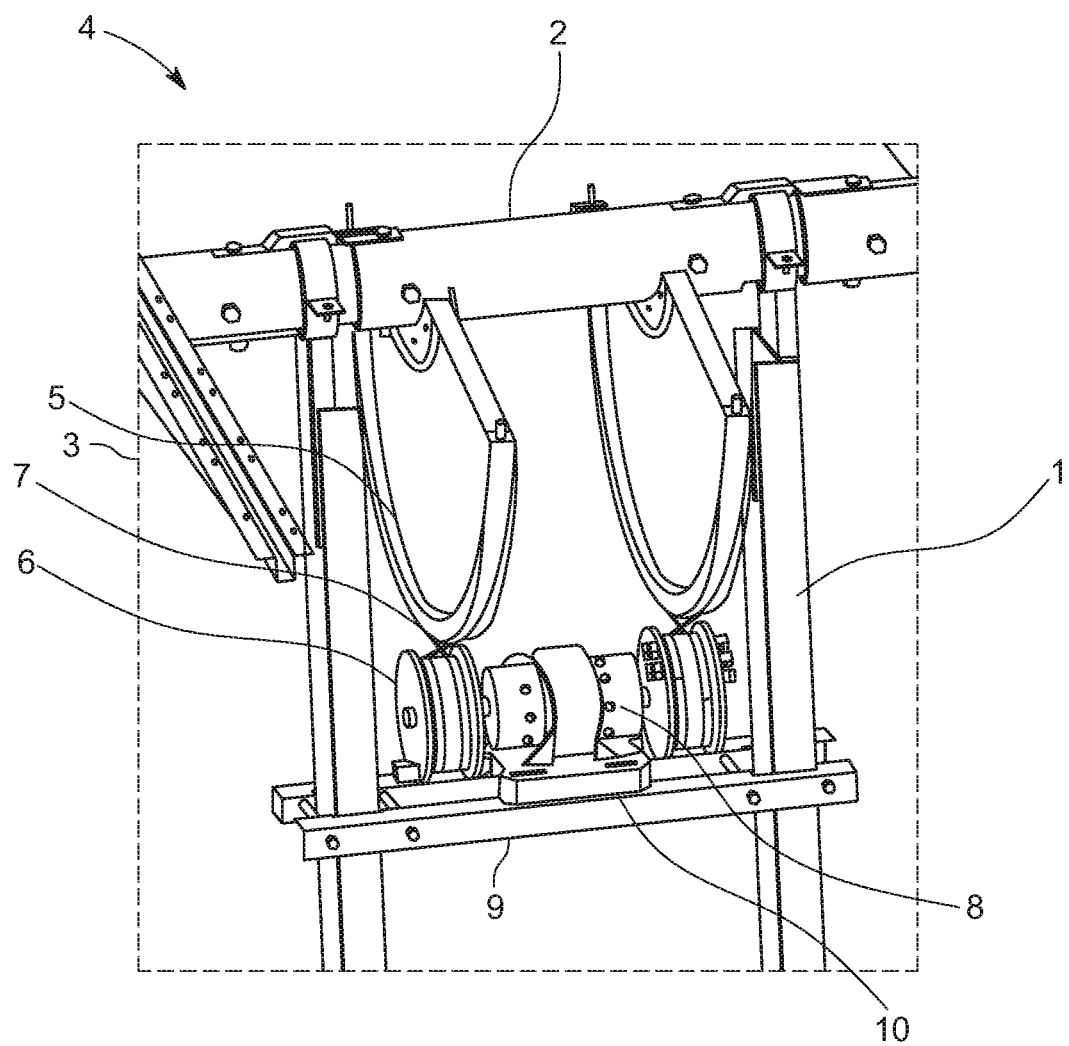
FIG. 3 shows elements that comprise a leveraged drive system, according to one or more embodiments.

FIG. 3 shows elements that comprise a leveraged drive system 4 (see also FIG. 2), according to one or more embodiments. In one embodiment, the power driver is a slew drive 8 with two winch-pulleys 6 mounted on each of the two ends of the slew drive 8 mounted to a bracket system 9, which attaches to one or two posts 1. A wire rope 7 is connected between the winch-pulley 6 and the larger radius torque tube half-pulley 5. As the winch pulley 6 simultaneously spools in and spools out, the wire rope 7 turns the larger radius torque tube half-pulley 5, which is attached to the torque tube 2, and turns the torque tube 2 and the solar modules 3. Typical slew drive systems are connected directly to a torque tube, and have to be 100% in line with the torque tube as an axle. A mis-alignment of the slew drive 8 on drive system 4 is compensated for by the flexible wire ropes 7. The slew drive 8 can attach to the two inner horizontal posts of the bracket system 9 and be adjustable up and down on the posts 1 by clamps, connectors, pins, etc. When loosened, the slew drive 8 can hang by the wire ropes, creating the perfect alignment and tension before re-tightening (re-attaching) of the slew drive mounting bracket 10 to the two posts 1. One advantage of one or more embodiments for the drive system 4 is that the slew drive 8 may be loosened from its attachment to the drive posts 1 and hang by the wire rope 7, self-aligning the slew drive 8 with the torque tube half-pulleys 5 on the torque tube 2 and self-tautening the wire rope(s) 7. Other advantages for one or more embodiments may include that the drive system 4 leverages the small slew drive 8 (e.g., ratios of 6:1 or 8:1), and the drive system 4 reduces material and cost to make the torque tube half-pulleys 5 wider.

Figure 4:
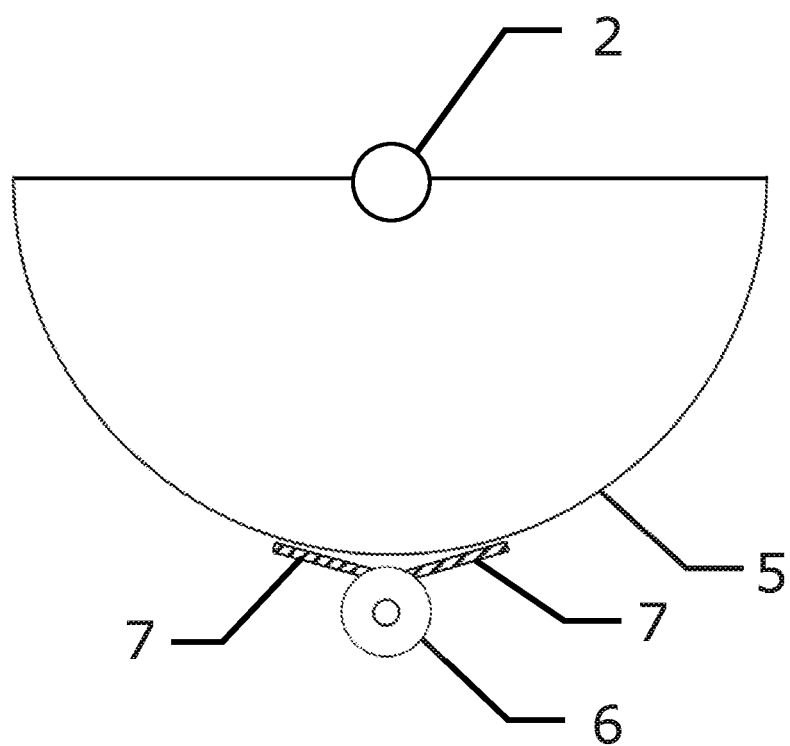
FIG. 4 shows a side view of the leveraged drive system with a winch-pulley shown pulling wire rope on one side while spooling out a wire rope on the other side of the half-pulley, which is attached to the torque tube, according to one or more embodiments.

FIG. 4 shows a side view of the leveraged drive system 4 with a winch-pulley 6 shown pulling wire rope 7 on one side while spooling out a wire rope 7 on the other side of the half-pulley 5, which is attached to the torque tube 2, according to one or more embodiments. In some embodiments, a slew drive 8 (FIG. 3) and pulley system, with round pulleys 6 and semi-round/circular or curved (partial) torque tube half-pulleys 5, are very forgiving in misalignment. The torque tube half-pulley 5 attaches at a slight angle relative to the normal of the torque tube 2. The torque tube half-pulley 5 moves wire rope 7 spooling and unspooling location as the torque tube 2 rotates the solar modules 3 (FIG. 2) between an east tilt and a west tilt. The torque tube half-pulley 5 yields leverage to the slew drive 8 and the winch-pulley 6 that attaches to two posts 1 of the bracket system 9 (FIG. 3) and is easily adjustable up and down (Z-axis) and left and right (X-axis).

Figure 5:
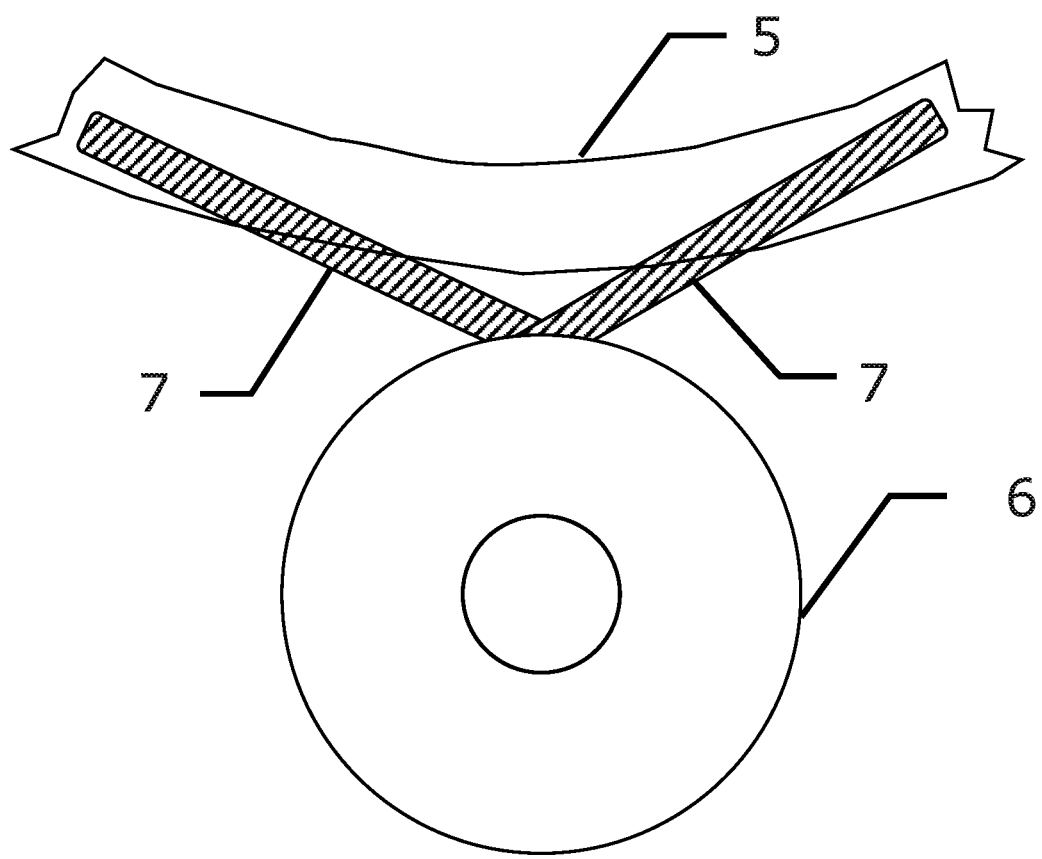
FIG. 5 shows a closeup view of the leveraged drive system shown in FIG. 4 at the interface of an exchange of the wire rope both to and from the winch pulley and the half-pulley, according to one or more embodiments.

FIG. 5 shows a closeup view of the leveraged drive system 4 at the interface of an exchange of the wire rope 7 both to and from the winch pulley 6 and the torque tube half-pulley 5, according to one or more embodiments. The central drive system for a large single-axis tracker row maintains engagement between the drive motor and the torque tube 2 (FIG. 4). A gear system must maintain strict alignment, otherwise disengagement between the drive gear and the larger torque tube gear can occur. A cable drive system can accept misalignments to a higher degree. Too much misalignment can cause the wire rope 7 to jump out of the torque tube half-pulley 5 landing, over the landing area's retaining walls that effectively make a single groove.

Figure 6A:
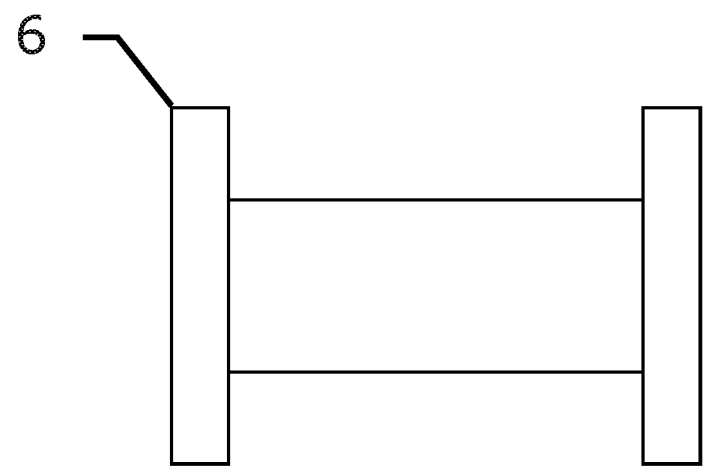
FIG. 6A shows a winch-pulley with a smooth drum surface, according to one or more embodiments.
Figure 6B:
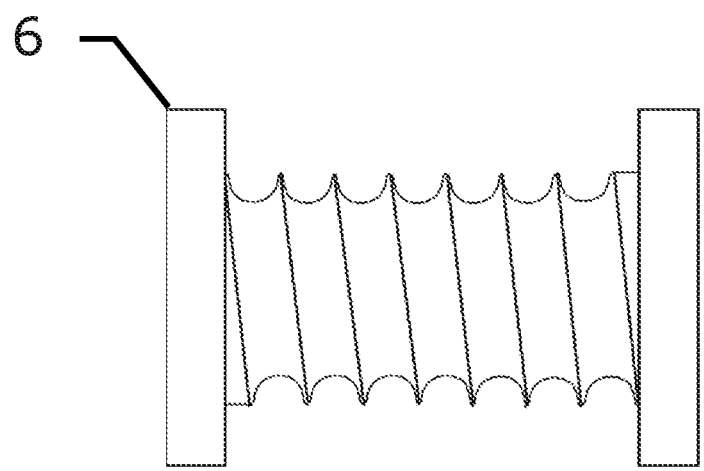
FIG. 6B shows a winch-pulley with a grooved drum for guiding the wire rope, according to one or more embodiments.

FIG. 6A shows a winch-pulley 6 with a smooth drum surface, according to one or more embodiments. FIG. 6B shows a winch-pulley 6 with a grooved drum for guiding the wire rope 7 (FIGS. 4-5), according to one or more embodiments. When the torque tube half-pulley 5 (FIG. 5) is attached to the torque tube 2 at a very slight angle (on the order of 0.5 degrees in the Z-axis), the system automatically maintains alignment with the spooling and unspooling of the wire rope 7 (FIG. 5) to and from the winch-pulley 6 drum.

Figure 7:
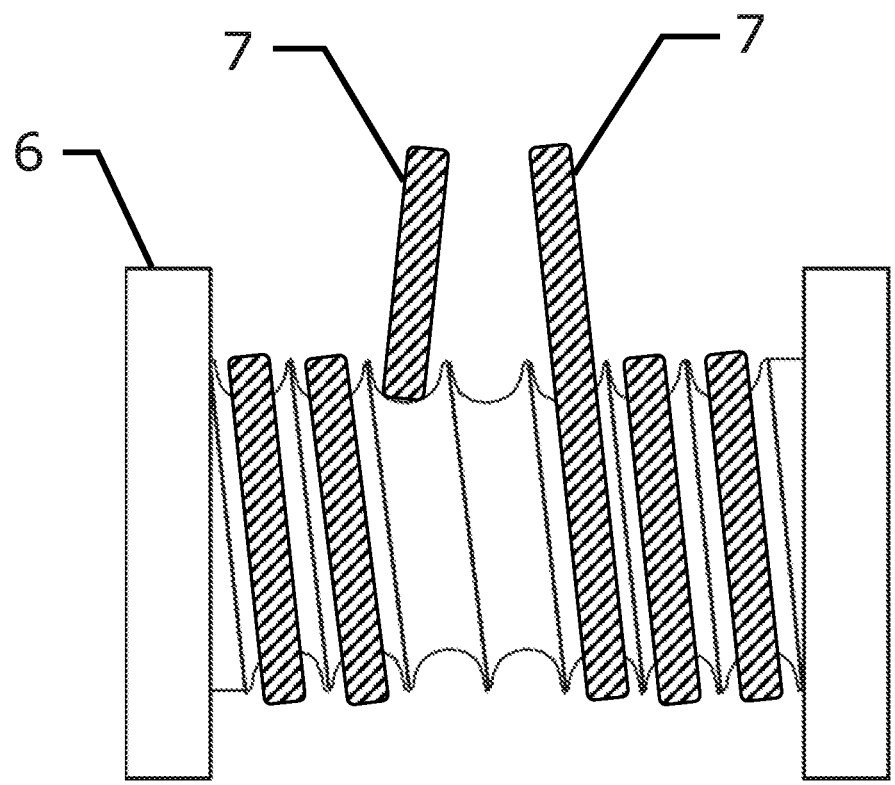
FIG. 7 shows a winch-pulley with a grooved drum with a wire rope feeding out in both directions from the top of the drum, according to one or more embodiments.

FIG. 7 shows a winch-pulley 6 with a grooved drum with the wire rope 7 feeding out in both directions from the top of the drum, according to one or more embodiments. In one embodiment, both wire ropes 7 are wrapped in an equal amount about the drum on the winch-pulley 6 representing the solar panels 3 (FIGS. 1-2) that are near flat. A turning of the winch-pulley 6 (via the slew drive 8, FIG. 3) results in the exit location of the wire rope 7 from the drum of the winch-pulley 6 to move left and right. One advantage of one or more embodiments is that the leveraged wire rope 7 drive system increases the reliability by allowing a high tolerance in misalignment. Another advantage of the one or more embodiments is that they allow misalignment of the wire rope 7 with the torque tube half-pulleys 5 (FIG. 5).

Figure 8:
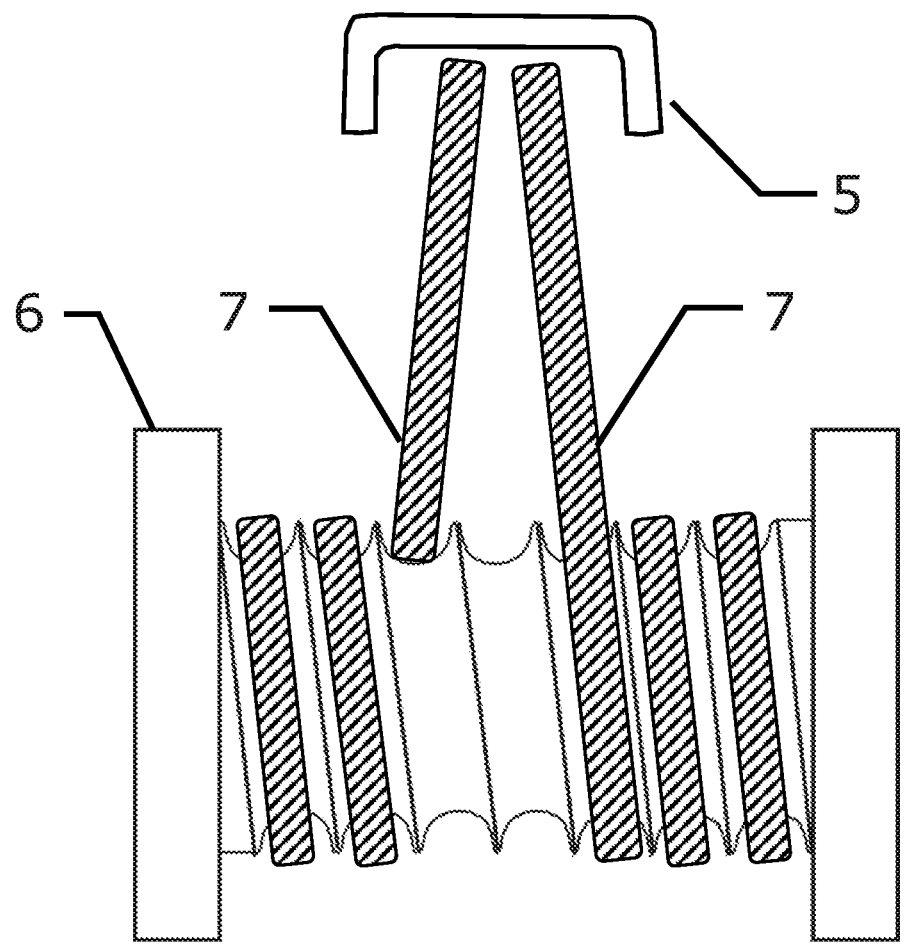
FIG. 8 shows the winch-pulley of FIG. 7 with the addition of the half-pulley and its single groove centered over the winch-pulley, according to one or more embodiments.

FIG. 8 shows the winch-pulley 6 of FIG. 7 with the addition of the torque tube half-pulley 5 and its single groove centered over the winch-pulley 6 with wire ropes 7, according to one or more embodiments. In one embodiment, the torque tube half-pulley 5 is aligned with the wire ropes 7 from the winch-pulley 6 drum. In one embodiment, the torque tube half-pulley 5 with a single groove may be narrow (e.g., ~1 in., etc.).

Figure 9:
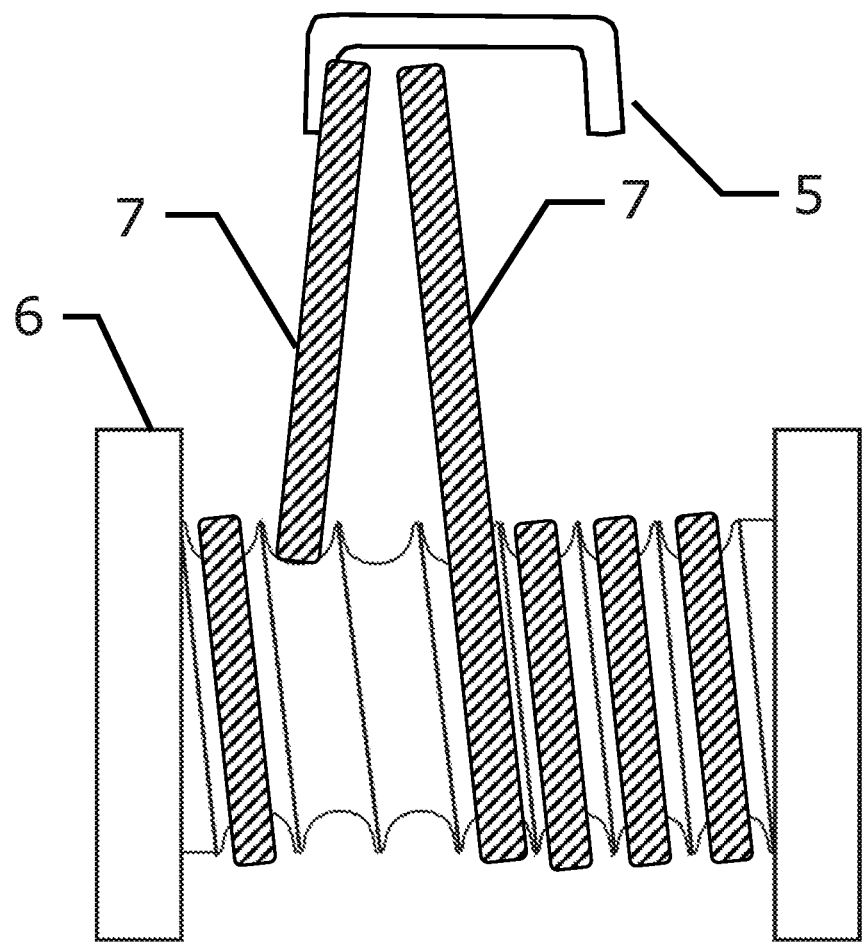
FIG. 9 shows the winch-pulley of FIG. 8 after the winch-pulley has made one full turn, according to one or more embodiments.

FIG. 9 shows the winch-pulley 6 of FIG. 8 after the winch-pulley 6 has made one full turn, according to one or more embodiments. The wire rope 7 has drifted left of the torque tube half-pulley 5 and is not-aligned with the wire ropes 7 from the drum of the torque tube half-pulley 5. In one embodiment, the torque tube half-pulley 5 may be a narrow single channel half-pulley (~1 in., etc.).

Figure 10A:
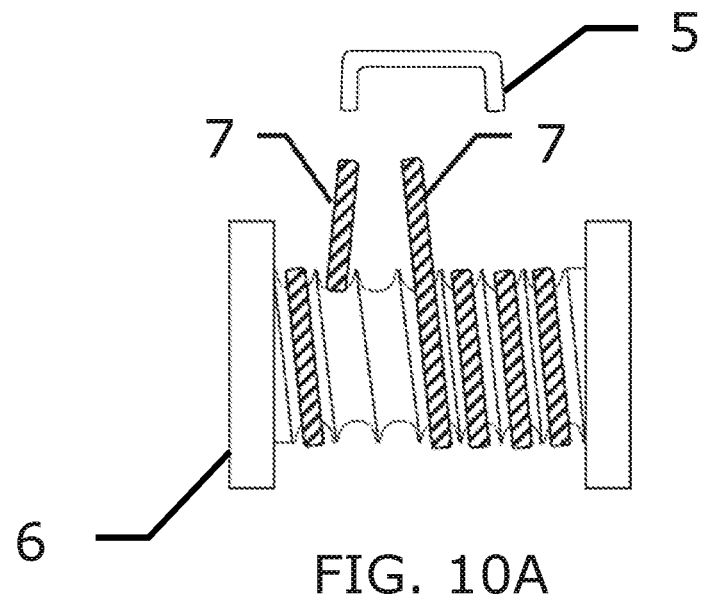
FIG. 10A shows a full turn clockwise from a neutral position when solar panels are near a flat state, according to one or more embodiments.

FIG. 10A shows the winch-pulley 6 and the torque tube half-pulley 5 with wire ropes 7 after a full turn clockwise from a neutral position when solar panels 3 (FIGS. 1-2) are near a flat state, according to one or more embodiments. In one embodiment, the torque tube half-pulley 5 may be a narrow (~1 in., etc.) single channel. As shown, the torque tube half-pulley 5 is not aligned with the wire ropes 7 from +/−one turn of the drum of the winch-pulley 6, according to one or more embodiments.

Figure 10B:
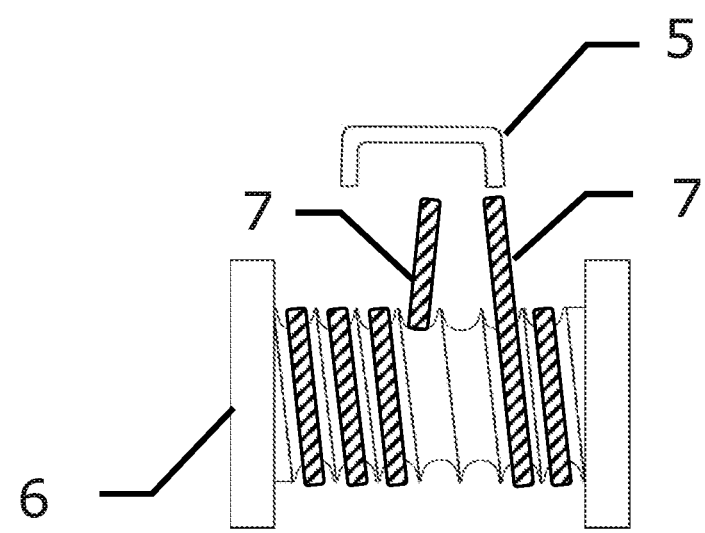
FIG. 10B shows a full turn counter-clockwise from the neutral position when the solar panels are near a flat state, according to one or more embodiments.

FIG. 10B shows the winch-pulley 6 and the torque tube half-pulley 5 with wire ropes 7 after a full turn counter-clockwise from the neutral position when the solar panels 3 (FIGS. 1-2) are near a flat state, according to one or more embodiments. In one embodiment, the torque tube half-pulley 5 may be a narrow (~1 in., etc.) single channel. As shown, the torque tube half-pulley 5 is not aligned with the wire ropes 7 from +/−one turn of drum of the winch-pulley 6, according to one or more embodiments.

Figure 11:
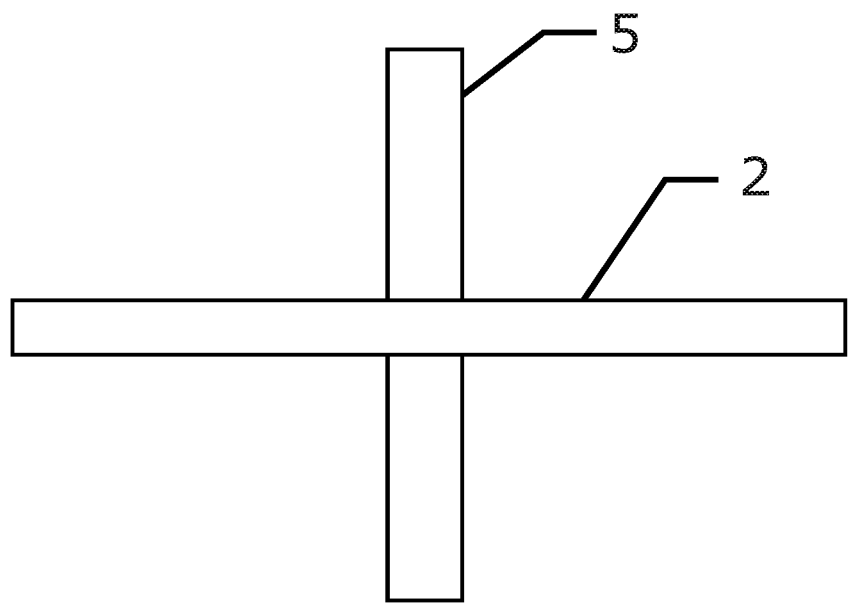
FIG. 11 shows a top view of the torque tube and a wide half-pulley, according to one or more embodiments.

FIG. 11 shows a top view of the torque tube 2 and a wide (e.g., ~3 in., etc.) torque tube half-pulley 5, according to one or more embodiments. The torque tube half-pulley 5 is attached perpendicular to the torque tube component 2.

Figure 12A:
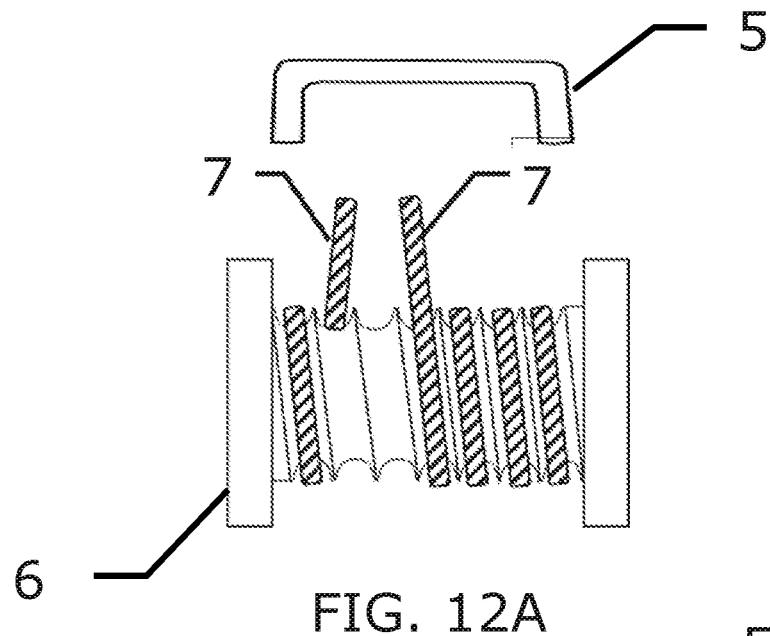
FIG. 12A shows another view for a full turn clockwise from the neutral position when the solar panels are near flat and the pulley is a fairly wide half-pulley, according to one or more embodiments.

FIG. 12A shows another view of the winch-pulley 6 with a wider torque tube half-pulley 5 and wire ropes 7 for a full turn clockwise from the neutral position when the solar panels 3 (FIGS. 1-2) are near flat and the torque tube half-pulley 5 is a fairly wide half-pulley, according to one or more embodiments.

Figure 12B:
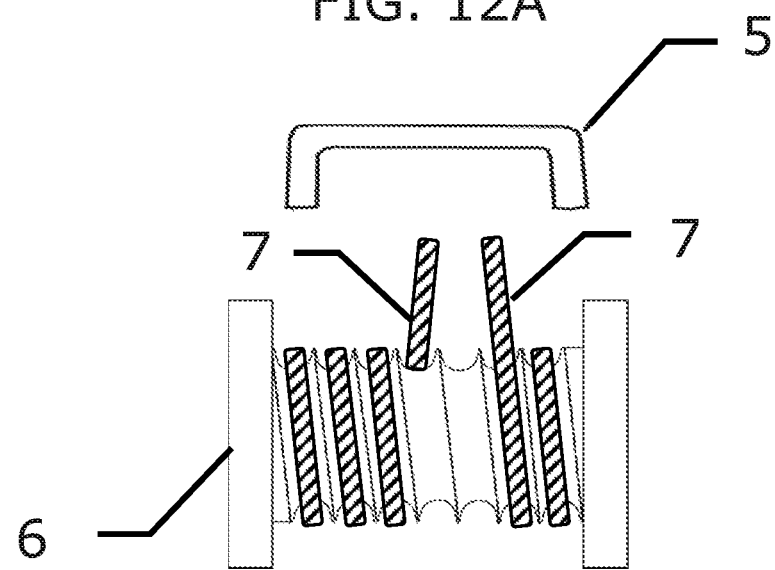
FIG. 12B shows another view for a full turn counter-clockwise from the neutral position when the solar panels are near flat and the half-pulley is a fairly wide half-pulley, according to one or more embodiments.

FIG. 12B shows a view of the winch-pulley 6 with a wider torque tube half-pulley 5 and wire ropes 7 for a full turn counter-clockwise from the neutral position when the solar panels 3 (FIGS. 1-2) are near flat and the torque tube half-pulley 5 is a fairly wide half-pulley, according to one or more embodiments.

Figure 13:
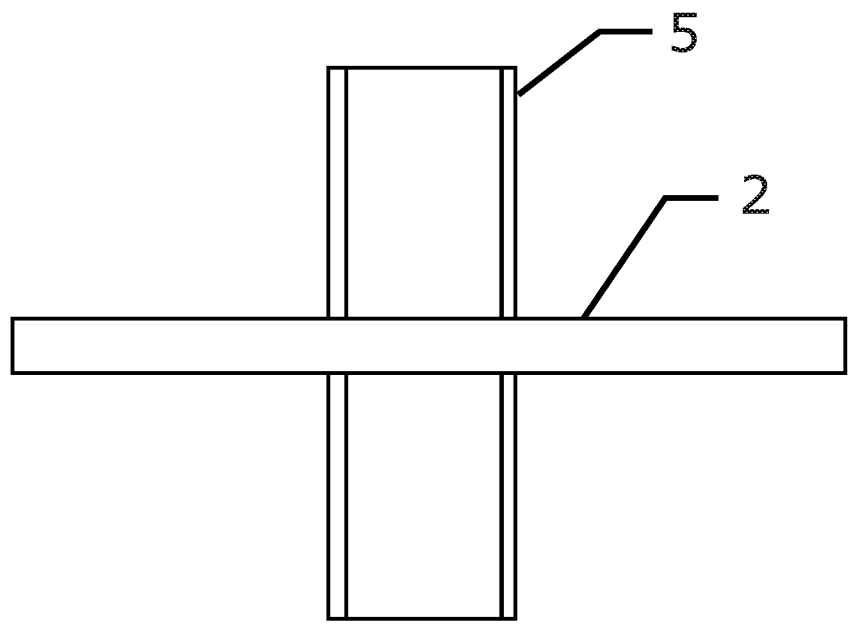
FIG. 13 shows a top view of the torque tube and a fairly wide half-pulley, according to one or more embodiments.

FIG. 13 shows a top view of the torque tube 2 and a fairly wide (e.g., ~18 in., etc.) torque tube half-pulley 5, according to one or more embodiments. The torque tube half-pulley 5 is attached perpendicular to the torque tube component 2.

Figure 14:
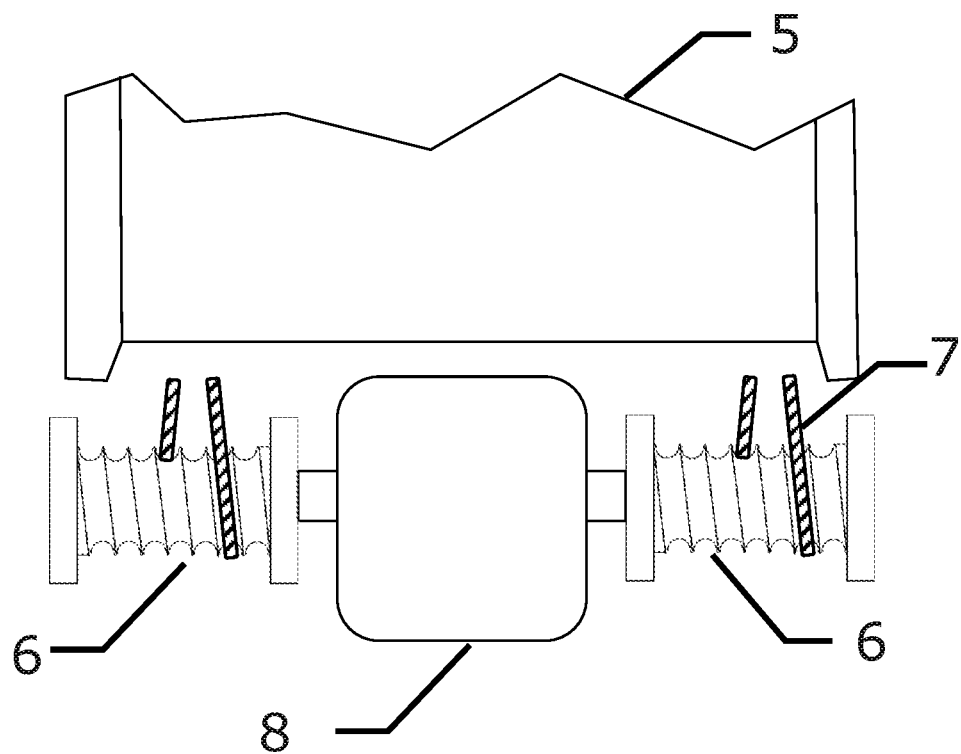
FIG. 14 shows a view of a very wide half-pulley aligned with wire ropes from +/−one turn of winch drums attached to a slew drive, according to one or more embodiments.

FIG. 14 shows a view of a very wide torque tube half-pulley 5 aligned with wire ropes 7 from +/−one turn of winch pulley drums 6 attached to a slew drive 8, according to one or more embodiments. The slew drive 8 includes a gearbox that safely holds radial and axial loads, as well as transmits a torque for rotating one or more axles. The rotation may be in a single axis or in multiple axes together. Typical slewing drives include gearing, bearings, seals, a housing, an electrical motor, and other auxiliary components, and are assembled into a gearbox.

There are several ways to drive the various embodiments. Some embodiments may include one or more (e.g., two, four, etc.) winch pulley drums 6. In one embodiment, the slew drive 8, which may be any winch type of drive, may have a single winch drum (or winch pulley) that may include a smooth or grooved drum surface for the wire rope 7, for simultaneously pulling in and letting out two wire rope 7 cables, or two ends of one wire rope 7 cable, to leverage-drive one or torque tube half-pulleys 5.

In one embodiment, the torque tube half-pulley 5 may have a single channel that is very wide (e.g., ~18 in., etc.) that is attached perpendicular to a torque tube, and is wide enough to accept the wire rope 7 from both winch pulleys 6 during winding and unwinding.

In another embodiment, the torque tube half-pulley 5 may include two single channels wide (e.g., ~3 in., etc.) half-pulleys separated by ~18 in., etc., where each torque tube half-pulley 5 is wide enough to accept a side-ways movement of the wire rope during winding and unwinding.

In still another embodiment, the torque tube half-pulley 5 may include two single channel narrow width (e.g., ~1 in., etc.) half-pulleys separated by ~18 in., etc., that are attached perpendicular to a torque tube and that cause misalignment with the moving wire rope during winding and unwinding.

In yet another embodiment, the torque tube half-pulley 5 may include two single channel narrow width (e.g., ~1 in., etc.) half-pulleys, which are just wide enough for a single wire rope 7. The two torque tube half-pulleys 5 are separated by ~18 in., etc., and are attached at a slight angle (e.g., ~0.5°, etc.) to the torque tube, which maintains alignment with the moving wire rope 7 during winding and unwinding of the winch pulley(s) 6.

Figure 15:
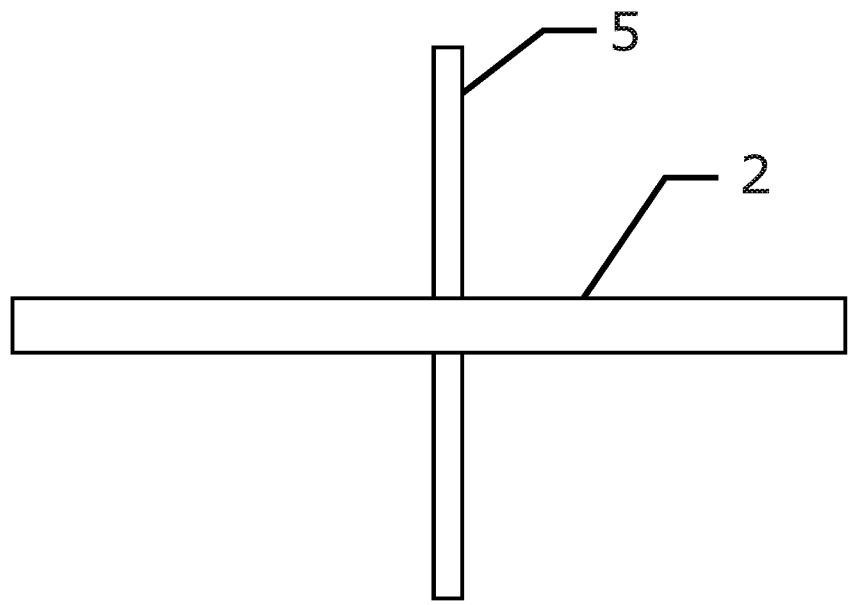
FIG. 15 shows a top view of the torque tube and a narrow half-pulley, according to one or more embodiments.

FIG. 15 shows a top view of the torque tube 2 and a narrow torque tube half-pulley 5, according to one or more embodiments. The torque tube half-pulley 5 is attached perpendicular to the torque tube 2. In one embodiment, the torque tube half-pulley 5 may be a narrow half-pulley with a width of about 1 in., etc.

Figure 16A:
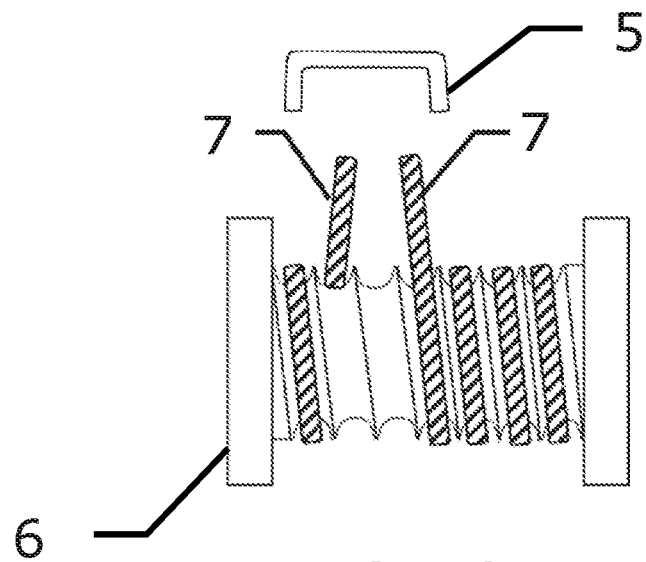
FIG. 16A shows the half-pulley drifting to the left with the wire rope as the winch-pulley completes one full turn clockwise, according to one or more embodiments.

FIG. 16A shows the half-pulley 5 drifting to the left with the wire rope 7 as the winch-pulley 6 completes one full turn clockwise, according to one or more embodiments. As shown, the torque tube half-pulley 5 is drifting left in synchronization with the left movement of the exiting wire rope 7 as a result of the torque tube half-pulley 5 being mounted to the torque tube 2 (FIGS. 2-3) not perpendicularly, but at a very small angle, such as 0.5 degrees.

Figure 16B:
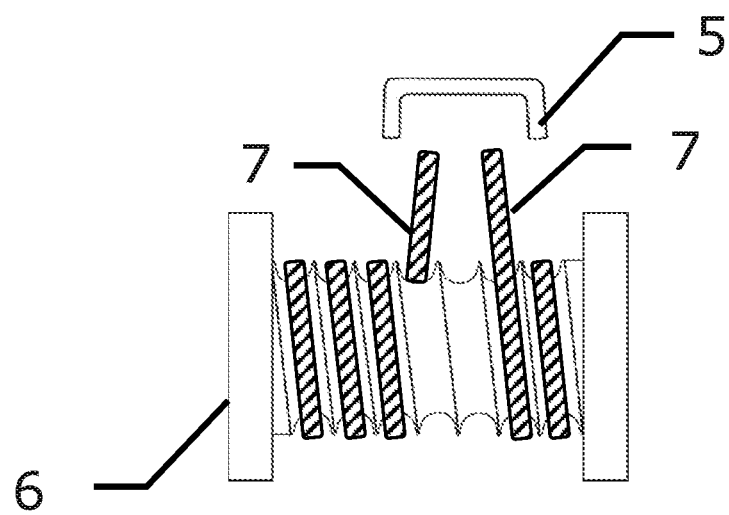
FIG. 16B shows the half-pulley drifting to the right with the wire rope as the winch-pulley completes one full turn counter-clockwise, according to one or more embodiments.

FIG. 16B shows the torque tube half-pulley 5 drifting to the right with the wire rope 7 as the winch-pulley 6 completes one full turn counter-clockwise, according to one or more embodiments. As shown, the torque tube half-pulley 5 is drifting right in synchronization with the right movement of the exiting wire rope 7 as a result of the torque tube half-pulley 5 being mounted to the torque tube 2 (FIGS. 2-3) not perpendicularly, but at a very small angle, such as 0.5 degrees.

Figure 17:
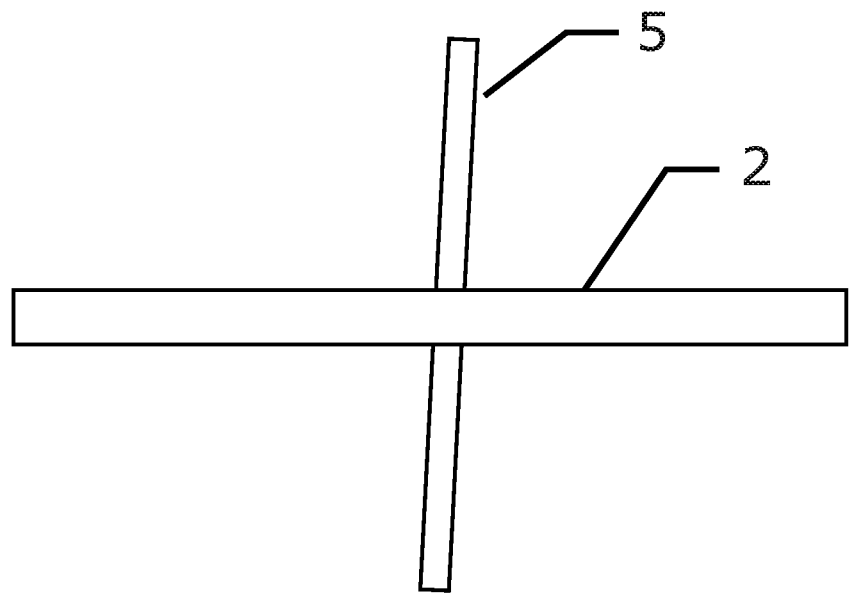
FIG. 17 shows a top view of the torque tube and half-pulley of FIG. 8 with the half-pulley attached to the torque tube at a very slight angle (e.g., 0.5 degrees), according to one or more embodiments.

FIG. 17 shows a top view of the torque tube 2 and the torque tube half-pulley 5 of FIG. 12 attached to the torque tube 2 at a very slight angle, such as 0.5 degrees, according to one or more embodiments.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A drive system comprising:
    a drive device with at least one drum for spooling at least one wire rope;
    a mounting device coupled to the drive device and a single-axis tracker; and
    at least one partial pulley coupled to a torque tube, the at least one partial pulley configured to accept the at least one wire rope and to transfer leveraged drive forces to the torque tube;
    wherein the mounting device comprises a bracket releasably couples to and extends between a first post and a second post, and the first post and the second post are each coupled to the torque tube.

2. The drive system of claim 1, wherein the at least one partial pulley has a width to accept the at least one wire rope moving by spooling and un-spooling of the at least one drum, and the drive device comprises one of a slew drive or a winch.

3. The drive system of claim 1, wherein the at least one partial pulley is configured to attach, at a particular angle, on the torque tube to maintain alignment of the at least one partial pulley with the at least one wire rope moving by spooling onto and un-spooling off of the at least one drum.

4. The drive system of claim 1, wherein the torque tube is coupled to at least one solar panel or at least one solar module that comprises a plurality of solar cells.

5. The drive system of claim 1, wherein the at least one partial pulley is semi-circular, and the drive device is configured to hang by the at least one wire rope upon loosening of the mounting device from the first post and the second post for alignment and tension between the at least one partial pulley and the at least one drum.

6. The drive system of claim 1, wherein the at least one partial pulley attaches at an angle of 0.5 degrees relative to a normal of the torque tube.

7. The drive system of claim 4, wherein the torque tube rotates the at least one solar panel or the at least one solar module between an east tilt and a west tilt, and the mounting device is adjustable up and down (Z-axis) and left and right (X-axis) relative to the first post and the second post.

8. A drive system comprising:
    a drive device with a first drum and a second drum for spooling one or more cables;
    a mounting device coupled to the drive device and a single-axis tracker; and
    a first partial pulley and a second partial pulley that are each coupled to a torque tube, the first and the second partial pulleys are each configured to accept the one or more cables and to transfer leveraged drive forces to the torque tube;
    wherein the mounting device comprises a bracket releasably couples to and extends between a first post and a second post, and the first post and the second post are each coupled to the torque tube.

9. The drive system of claim 8, wherein the first partial pulley has a first width to accept the one or more cables moving by spooling and un-spooling of the first drum, the second partial pulley has a second width to accept the one or more cables moving by spooling and un-spooling of the second drum, and the drive device comprises a slew drive or a winch.

10. The drive system of claim 8, wherein the first and the second partial pulleys are each configured to attach, at a particular angle, on the torque tube to maintain alignment of: the first partial pulley with the one or more cables moving by spooling onto and un-spooling off of the first drum, and of the second partial pulley with the one or more cables moving by spooling onto and un-spooling off of the second drum.

11. The drive system of claim 8, wherein the torque tube is coupled to at least one solar panel or at least one solar module that includes a plurality of solar cells.

12. The drive system of claim 8, wherein each of the first partial pulley and the second partial pulley are semi-circular, and the drive device is configured to hang by the one or more cables upon loosening of the mounting device from the first post and the second post for alignment and tension between the first partial pulley and the first drum, and the second partial pulley and the second drum.

13. The drive system of claim 8, wherein each of the first partial pulley and the second partial pulley attaches at an angle of 0.5 degrees relative to a normal of the torque tube.

14. The drive system of claim 12, wherein the torque tube rotates the solar panel between an east tilt and a west tilt, and the mounting device is adjustable up and down (Z-axis) and left and right (X-axis) relative to the first post and the second post.

15. A drive system comprising:
    a drive device with a first drum and a second drum for spooling one or more cables;
    a mounting device coupled to the drive device and a single-axis tracker;
    a first partial pulley and a second partial pulley that are each coupled to a torque tube, the first and the second partial pulleys are each configured to accept the one or more cables and to transfer leveraged drive forces to the torque tube; and
    a first solar component and a second solar component are each coupled with the torque tube;
    wherein the mounting device comprises a bracket releasably couples to and extends between a first post and a second post, and the first post and the second post are each coupled to the torque tube.

16. The drive system of claim 15, wherein the first partial pulley has a first width to accept the one or more cables moving by spooling and un-spooling of the first drum, the second partial pulley has a second width to accept the one or more cables moving by spooling and un-spooling of the second drum, the drive device comprises a slew drive or a winch, and the first solar component and the second solar component are each one of a solar panel or a solar module that includes a plurality of solar cells.

17. The drive system of claim 15, wherein the first and the second partial pulleys are each configured to attach, at a particular angle, on the torque tube to maintain alignment of: the first partial pulley with the one or more cables moving by spooling onto and un-spooling off of the first drum, and of the second partial pulley with the one or more cables moving by spooling onto and un-spooling off of the second drum.

18. The drive system of claim 15, wherein each of the first partial pulley and the second partial pulley are semi-circular, and the drive device is configured to hang by the one or more cables upon loosening of the mounting device from the first post and the second post for alignment and tension between the first partial pulley and the first drum, and the second partial pulley and the second drum.

19. The drive system of claim 15, wherein each of the first partial pulley and the second partial pulley attaches at an angle of 0.5 degrees relative to a normal of the torque tube.

20. The drive system of claim 15, wherein the torque tube rotates each of the first solar panel and the second solar panel between an east tilt and a west tilt, and the mounting device is adjustable up and down (Z-axis) and left and right (X-axis) relative to the first and second posts.

* * * * *